(12) United States Patent
Brinck et al.

(10) Patent No.: US 9,589,032 B1
(45) Date of Patent: Mar. 7, 2017

(54) UPDATING CONTENT PAGES WITH SUGGESTED SEARCH TERMS AND SEARCH RESULTS

(75) Inventors: Tom Brinck, Palo Alto, CA (US); Matthew Amacker, San Jose, CA (US)

(73) Assignee: A9.com, Inc., Palo Alto, CA (US)

(*) Notice: Subject to any disclaimer, the term of this patent is extended or adjusted under 35 U.S.C. 154(b) by 713 days.

(21) Appl. No.: 12/731,451

(22) Filed: Mar. 25, 2010

(51) Int. Cl.
*G06F 17/30* (2006.01)
(52) U.S. Cl.
CPC .................. *G06F 17/30554* (2013.01)
(58) Field of Classification Search
CPC ......... G06F 17/30554; G06F 17/30867; G06F 17/30864; G06F 17/3097; G06F 17/3064; G06F 17/30696; G06F 17/30277; G06F 17/30991
See application file for complete search history.

(56) References Cited

U.S. PATENT DOCUMENTS

| | | | |
|---|---|---|---|
| 7,657,126 B2* | 2/2010 | Gokturk et al. | 382/305 |
| 2004/0267740 A1* | 12/2004 | Liu et al. | 707/3 |
| 2006/0075120 A1* | 4/2006 | Smit | 709/227 |
| 2006/0282416 A1* | 12/2006 | Gross | G06F 17/30864 |
| | | | 707/999.003 |
| 2009/0064029 A1* | 3/2009 | Corkran et al. | 715/781 |

* cited by examiner

*Primary Examiner* — Yuk Ting Choi
(74) *Attorney, Agent, or Firm* — Thomas | Horstemeyer, LLP (57) ABSTRACT

Asynchronous updating of content pages with suggested search terms and search results is performed by receiving at least one character from a search term user interface element is received and suggested search terms are generated. At least one search result associated with the at least one suggested search term is retrieved from an electronic repository, and the content page is asynchronously updated with additional data about the search result retrieved from the electronic repository.

15 Claims, 10 Drawing Sheets

UPDATING CONTENT PAGES WITH SUGGESTED SEARCH TERMS AND SEARCH RESULTS

BACKGROUND

Search systems can be employed in various settings, including in a general purpose setting or in an electronic commerce system. Search systems can surface various items in an electronic repository. In addition, search systems can generate suggested search terms for a user based at least upon characters entered by a user in a search user interface element. Search engines often do not provide additional information about a suggested search term and may require submission of a search term in a search user interface element in order to see the results of a particular suggested search term.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to identifying suggested search terms that can be employed by users to locate one or more items in an electronic repository. In addition, the embodiments described herein relate to retrieving additional data regarding the suggested search terms identified by the embodiments, and asynchronously updating user interface elements with the suggested search terms and the retrieved data.

Embodiments of the disclosure can, upon suggesting search terms based at least upon one or more characters entered in a search term user interface element in a content page, retrieve and display additional data from an electronic repository for one or more items associated with the suggested search terms. The content page can then be asynchronously updated with the retrieved data. In one non-limiting embodiment, one or more images associated with the item can be retrieved from an electronic repository and the content page asynchronously updated with the images.

Additionally, the content page can be asynchronously updated with other information related to an item associated with a suggested search term. As a non-limiting example, in the case of an electronic commerce system associated with a content page displaying the search term user interface element, the content page can be updated with a purchasing user interface element, allowing a user to purchase an item associated with a suggested search term via an asynchronously updated user interface element. In other words, embodiments of the disclosure allow a user to interact with a search result associated with a suggested search term without having to cause a search term user interface element to execute a search and display a second content page containing one or more search results.

Figure 1:
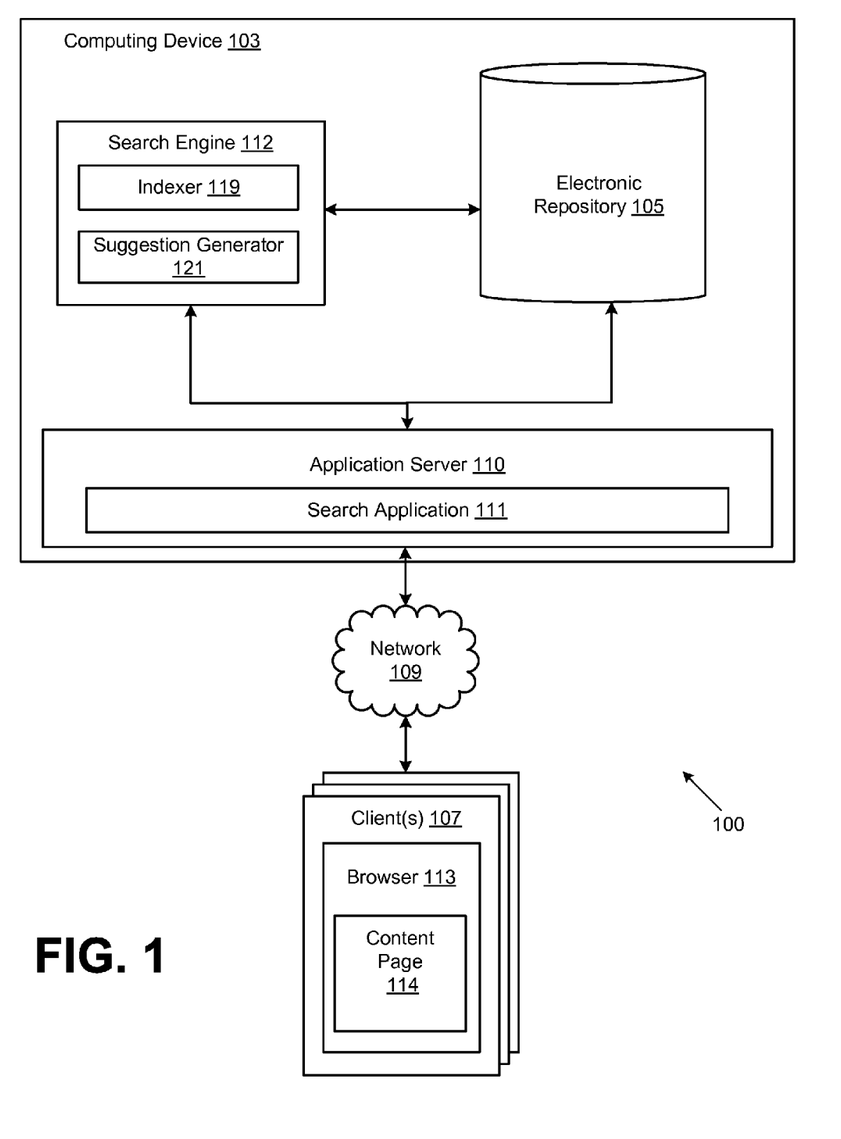
FIG. 1 is a drawing of a networked environment including a computing device executing a search application according to an embodiment of the present disclosure.

With reference to FIG. 1, shown is a networked environment 100 according to various embodiments. The networked environment 100 includes at least one computing device 103, an electronic repository 105, and at least one client 107 in communication with the computing device 103 via a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data and/or items are stored in an electronic repository 105 that is accessible to the computing device 103. The electronic repository 105 may be representative of a plurality of data stores that can be geographically disparate and accessible to the computing device 103 via a network 109, as can be appreciated. As a non-limiting example, applications facilitating embodiments of this disclosure can be executed on the computing device 103, and other devices dedicated to providing the functionality of an electronic repository 105 or data store can be located in a separate installation accessible to the computing device 103. Additionally, the items and/or data stored in the electronic repository 105, for example, are associated with the operation of the various applications and/or functional entities described below.

The electronic repository 105, in the non-limiting example of an electronic commerce system facilitated by the computing device 103, can include items that are associated with products available in the electronic commerce system. The electronic repository 105 can also include other data relevant to products, such as, but not limited to, the following: product category, title, keywords, description, price, weight, shipping methods, related images, reviews, similar items, meta data, hidden text, a list of merchants selling the item, stock number, other associated categories, page view history, etc. The electronic repository 105 can also include other data related to products as can be appreciated, but are not necessary to discuss herein for an understanding of the various embodiments of the disclosure. Additionally, in the case of a computing device 103 facilitating a content system other than an electronic commerce system (e.g., a general purpose search engine, etc.), the electronic repository 105 can store other data associated with items for which the content system is suited.

The computing device 103 is configured to execute various applications such as, for example, an application server 110, a search application 111, a search engine 112, and other applications. In one embodiment, an application server 110 is executed to provide for interaction between the applications on the computing device 103 and clients 107 as will be described. To this end, the application server 110 may also include, for example, a web server application or similar application as can be appreciated. Other systems and/or applications facilitated or executed by an application server 110 may also include, but are not limited to, order fulfillment systems, dynamic network or web page servers, inventory systems, or other systems as can be appreciated. However, such systems are not described herein in detail.

Users of an electronic repository 105, whether in the context of an electronic commerce system, a general purpose search engine, or other system, may attempt to use search terms or search phrases to locate one or more items in the electronic repository 105.

The client 107 is representative of a plurality of client devices that may be coupled to the network 109. The client 107 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 107 may be configured to execute various applications such as a browser 113 and/or other applications. The browser 113 may be executed in a client 107, for example, to access and render content pages 114, such as web pages, or other network content served up by the computing device 103 and/or other servers. The client 107 may be configured to execute applications beyond a browser 113 such as, for example, email applications, instant message applications, and/or other applications. Accordingly, in some embodiments a user can manipulate a user interface presented in the form of content pages 114 in a browser 113 or other application that causes interaction with the application server 110 executed by the computing device 103. The application server 110 executed on the computing device 103 can facilitate the generating of user interfaces on a client 107 by transmitting data to the client 107 that can be rendered by a browser 113 or other application to create the various user interfaces.

Therefore, in the context of the non-limiting exemplary framework presented above, in order to facilitate embodiments of the present disclosure, the search application 111 is executed to collect and process information relating to user submitted queries regarding related products, product categories, and/or other data accessible to the computing device 103. To this end, the search application 111 can facilitate the generating of a search term user interface element that allows a user to submit search terms for items the user wishes the locate in the electronic repository 105.

In addition, the search application 111 can provide suggested search terms to a user based at least upon characters entered in a search term user interface provided by the search application 111 on a client 107. In embodiments of the disclosure, the search application 111 can facilitate asynchronous updating of the search term user interface element, other user interface elements, or a content page 114 displayed on a client 107 with the suggested search terms. In one embodiment, the suggested search terms can be requested by the search application 111 from the search engine 112, and the suggestion generator 121 can provide suggested search terms to the search application 111 based upon various factors as noted above. The search application 111 can then facilitate asynchronously updating a user interface on a client 107 with the suggested search terms.

As can be appreciated, the search engine 112 is also executed in the computing device 103 to facilitate the indexing of items in the electronic repository 105 and to provide search results or responses to search queries submitted by the search application 111. To this end, the search engine 112 can include an indexer 119 that can crawl and/or index the items in the electronic repository 105 to build a searchable index maintained or accessible to the search engine 112 for retrieval of items by various search terms. When a user submits one or more search terms in a search term user interface element to the search application 111, the search engine 112 can provide search results for the search terms from the searchable index generated by the indexer 119.

As noted above, the search engine 112 can also include a suggestion generator 121 that can generate suggested search terms on behalf of a user. Suggested search terms can be associated with a search result, or, in other words, with an item in the electronic repository 105. Suggested search terms can be generated based at least upon characters entered in a search term user interface element on a client 107. As a non-limiting example, if a user enters the first letter of a search term in a search term user interface element, the search application 111 can request suggested search terms having the same first letter from the search engine 112 and/or the suggestion generator 121. The suggestion generator 121 can then provide one or more suggested search terms based at least upon the input of a user in the search term user interface element.

In one embodiment, the search term user interface element can suggest search terms to a user based at least upon the characters entered in the search term user interface element. In some embodiments, in the case of a search engine 112 in an electronic commerce system, search terms can also be suggested to the user based upon the shopping history or preferences of the user, the popularity of certain search terms among other users, or other factors as can be appreciated. In yet other embodiments, search terms can be suggested to a user based upon matching various aspects of a profile of a user with specific items in the electronic repository 105 or based upon the popularity of particular items in the electronic repository 105.

In one embodiment, the suggestion generator 121 can provide a list or other data structure containing a plurality of suggested search terms associated with user input, and the search application 111 can asynchronously update the user interface (e.g., a content page 114) on a client 107 to display one or more of the suggested search terms. The suggestion generator 121 can rank or prioritize the suggested search terms as can be appreciated, and the search application 111 can display the suggested search terms according to such a ranking or priority.

According to embodiments of the disclosure, the search application 111, upon receiving suggested search terms from the suggestion generator 121, can also retrieve additional data for each of the suggested search terms from the electronic repository 105. The search application 111 can then facilitate display of this additional data on a content page 114 in a browser 113 on a client 107 or in another type of user interface by asynchronously updating the client 107 user interface with the additional data. As a non-limiting example, the search application 111 can identify at least one search result associated with a suggested search term and retrieve representative imagery or other media associated with the at least one search result from the electronic repository 105. The search application 111 can then asynchronously update the user interface on a client 107 with the representative imagery or other media alongside the suggested search terms. In one embodiment, the search application 111 can select a predefined subset of the imagery associated with a search result in the electronic repository 105, and asynchronously update the client 107 user interface with the subset.

The user interface rendered on client 107, which is generated by asynchronous updates by the search application 111, can further allow the user to navigate through the suggested search terms and the additional data retrieved for each search result associated with a respective suggested search term. In one embodiment, a search term user interface element on a content page 114 rendered by a browser 113 can be asynchronously updated with representative imagery by the search application 111 and allow a user to select one or more of the representative images for enlargement in the user interface rendered by the browser 113. In this way, a user can select the various suggested search terms and the associated data (e.g., representative imagery) with an input device (e.g., a mouse, a keyboard, etc.) on a client 107, thereby allowing a user on a client 107 to view not only the suggested search term, but also additional data regarding the search term without causing the search term user interface element to submit a form to the search application 111, which would cause a search results page or a new content page 114 to be generated.

Aside from representative imagery or other media associated with a search result corresponding to a suggested search term, the search application 111 can also retrieve other information from the electronic repository 105 or generate other user interface elements with which a content page 114 on a client 107 can be updated. As a non-limiting example, in the case of an electronic commerce system facilitated by the computing device 103, the search application 111 can asynchronously update a content page 114 on a client 107 with a purchasing user interface element, which can allow a user to purchase an item in the electronic repository 105 that is associated with a product.

Figure 2A:
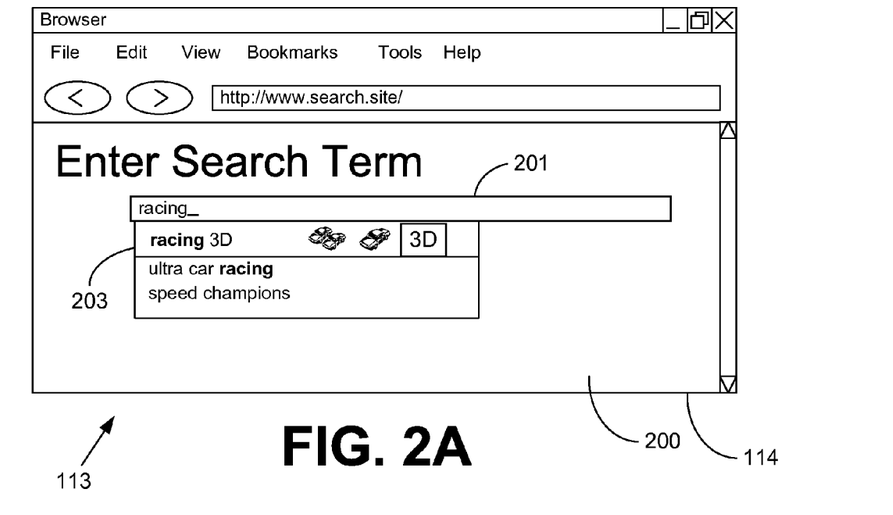
FIG. 2A is a drawing of a user interface generated by the computing device of FIG. 1 according to an embodiment of the present disclosure.

Accordingly, reference is now made to FIG. 2A, which depicts a search term user interface 200 in a content page 114 that can be rendered in a browser 113 on a client 107 (FIG. 1). In some embodiments, the search term user interface 200 may be embodied in a content page 114 that can be transmitted over a network 109 (FIG. 1) from the computing device 103 (FIG. 1) to a client 107. The search term user interface 200 includes a search term user interface element 201 that allows a user to enter search terms for submission to the search application 111 (FIG. 1). Additionally, the search term user interface element 201 can be asynchronously updated by the search application 111 with suggested search terms provided by the search engine 112 (FIG. 1) and/or suggestion generator 121 (FIG. 1). The search term user interface element 201 can also be asynchronously updated with additional data retrieved from the electronic repository 105 (FIG. 1) or with other data or user interface elements.

In the depicted example, the user has entered at least a portion of a search term ("racing") in the search term user interface element 201. The search application 111 has, in response, asynchronously updated the search term user interface element 201 of the depicted content page 114 with a dropdown box 203 that displays the suggested search terms that the suggestion generator 121 has determined are related to the characters entered in the search term user interface element 201.

The search application 111 asynchronously updates the dropdown box 203 with additional data retrieved from the electronic repository 105 that is associated with at least one search result that is in turn associated with one of the suggested search terms. In the depicted example, the dropdown box 203 is asynchronously updated with product imagery corresponding to a product that may appear as a search result associated with the suggested search term selected by a user. As one non-limiting example, in the depicted search term user interface 200, the search application 111 can asynchronously update the dropdown box 203 with one image associated with three search results. Accordingly, the user can access any of the three search results by following or activating a link associated with an image displayed in the dropdown box 203. The search application 111 can, in other embodiments, display description text corresponding to a search result associated with an image displayed in the dropdown box 203 when a user navigates over the image.

In one embodiment, the user can navigate over a suggested search term and/or image by providing navigation input via a keyboard, mouse, or other input device. As one non-limiting example, the user can mouse over a suggested search term in the dropdown box 203, and the browser 113 (FIG. 1) can report the mouse position to the search application 111. When the search application 111 detects that the mouse position of a user corresponds to the location of a particular suggested search term, the search application 111 can asynchronously update the dropdown box 203 with product imagery corresponding to a search result associated with the suggested search term.

As another non-limiting example, the user can navigate with the arrow keys of a keyboard associated with a client 107 (FIG. 1) to navigate through a list of suggested search terms displayed in the dropdown box 203. The browser 113 can report the keyboard input of a user to the search application 111, and when the search application 111 detects that a user has navigated to a particular suggested search term in the dropdown box 203, the search application 111 can asynchronously update the dropdown box 203 with product imagery corresponding to a search result associated with the suggested search term. It should be also appreciated that various user interface elements other than a dropdown box 203 can be employed to display suggested search terms as well as additional data associated with search results corresponding to the suggested search terms, and that the depicted dropdown box 203 is but one example.

Figure 2B:
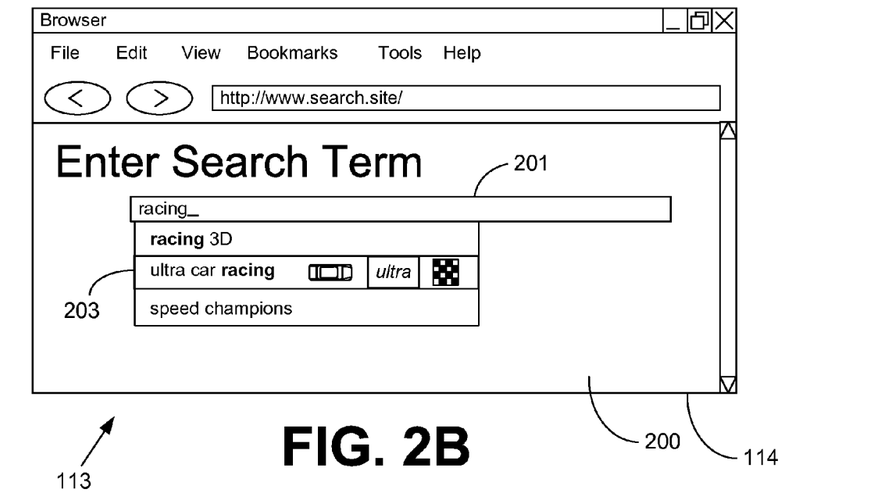
FIG. 2B is a drawing of the user interface of FIG. 2A that is asynchronously updated according to an embodiment of the present disclosure.

Continuing the example of FIG. 2A, reference is now made to FIG. 2B, which further illustrates the further asynchronous updating of the search term user interface 200 (FIG. 1) of FIG. 2A by the search application 111 (FIG. 1). In the depicted example, a user has selected another suggested search term in the depicted dropdown box 203 (FIG. 1). Accordingly, the search application 111 asynchronously updates the dropdown box 203 with additional data retrieved from the electronic repository 105 that is associated with a search result that is in turn associated with the suggested search term selected by the user. In the depicted example, as in FIG. 2A, the dropdown box 203 is asynchronously updated with imagery associated with the search result.

Figure 3A:
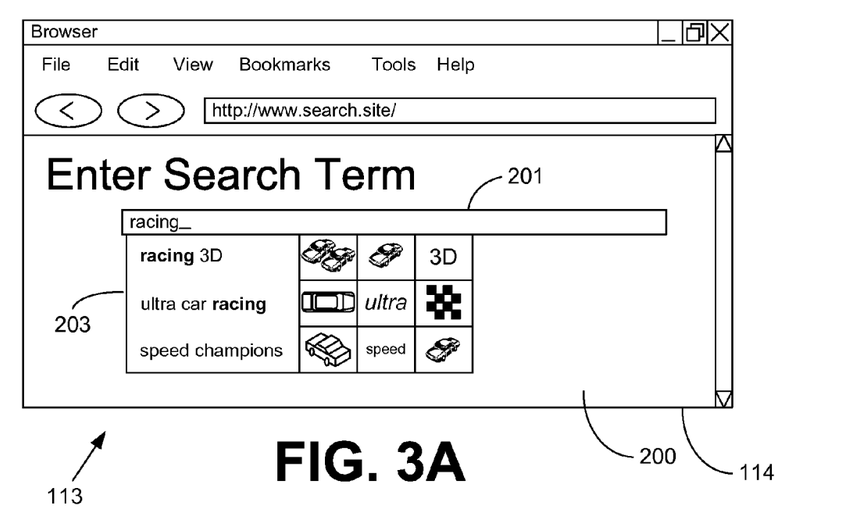
FIG. 3A is a drawing of a user interface generated by the computing device of FIG. 1 according to an embodiment of the present disclosure.

Reference is now made to FIG. 3A, which depicts an example of an alternative search term user interface 200 rendered on a client 107 (FIG. 1) that can be asynchronously updated by the search application 111 (FIG. 1) according to an embodiment of the disclosure. In the depicted non-limiting example, which is in the context of an electronic commerce system implemented by the computing device 103 (FIG. 1), the user has entered characters of a search term in the search term user interface element 201, and the search application 111 asynchronously updates the dropdown box 203 with suggested search terms retrieved from the suggestion generator 121 (FIG. 1) of the search engine 112 (FIG. 1).

In the depicted example, the user has entered at least a portion of a search term ("racing") in the search term user interface element 201. The search application 111 has, in response, asynchronously updated the search term user interface element 201 of the depicted content page 114 with a dropdown box 203 that displays the suggested search terms that the suggestion generator 121 has determined are related to the characters entered in the search term user interface element 201. Additionally, the search application 111 asynchronously updates the dropdown box 203 with imagery associated with a search result that is in turn associated with each of the suggested search terms.

Figure 3B:
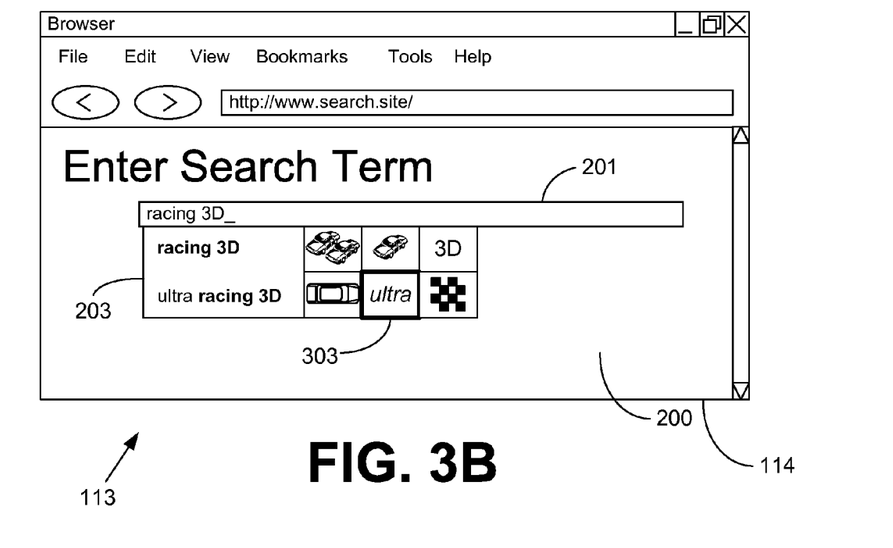
FIG. 3B is a drawing of the user interface of FIG. 3A that is asynchronously updated by the computing device of FIG. 1 according to an embodiment of the present disclosure.

Continuing the example of FIG. 3A, reference is now made to FIG. 3B, which further illustrates the asynchronous updating of the search term user interface 200 of FIG. 3A by the search application 111 (FIG. 1). In the depicted example, a user has further refined the entered search term, or entered additional characters in the search term user interface element 201. Accordingly, the search application 111 asynchronously updates the dropdown box 203 with suggested search terms retrieved from the suggestion generator 121 (FIG. 1) of the search engine 112 (FIG. 1) that correspond to the characters entered in the search term user interface element 201. In the non-limiting example of FIG. 3B, the additional entered characters cause the suggestion generator 121 to determine that one of the suggested search terms depicted in FIG. 3A is no longer related to the search term in the search term user interface element 201. Accordingly, the search application 111 asynchronously updates the dropdown box 203 of the search term user interface element 201 by removing the suggested search term and the additional data retrieved from the electronic repository 105 (FIG. 1) that is associated with the suggested search term.

The depicted search term user interface 200 can also allow a user to navigate the additional data provided by the search application 111 and further inspect and/or review the data. In one embodiment, as depicted in FIG. 3B, the user can navigate the additional data (e.g., representative imagery) retrieved from the electronic repository 105 that is associated with the items by using a keyboard, mouse, or other input device, and the search application 111 can asynchronously update the search term user interface element 201 or dropdown box 203 to indicate this navigation input. In the depicted non-limiting example, the search application 111 asynchronously updates the appearance of the dropdown box 203 to reflect a user selection of the highlighted image 303.

Figure 3C:
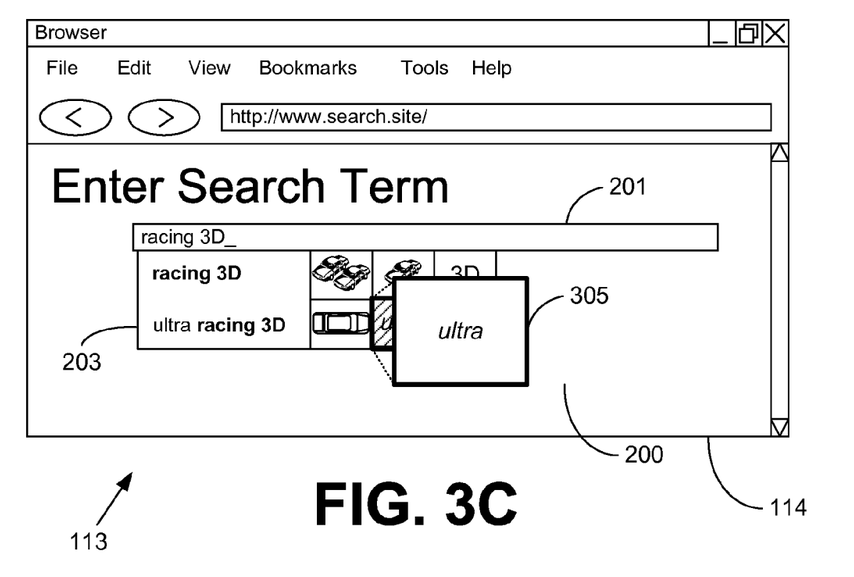
FIG. 3C is a drawing of the user interface of FIG. 3A that is asynchronously updated by the computing device of FIG. 1 according to an embodiment of the present disclosure.

FIG. 3C continues the non-limiting example shown in FIG. 3B according to various embodiments. In the depicted search term user interface 200, the search application 111 (FIG. 1) has asynchronously updated the search term user interface 200 to reflect navigation input of a user on a client 107 (FIG. 1). In the depicted example, a user has selected an image with which the search application 111 has asynchronously updated the dropdown box 203. Accordingly, the search application 111 asynchronously updates the search term user interface 200 to reflect the selection of the user by enlarging the selected representative image 305.

Figure 4:
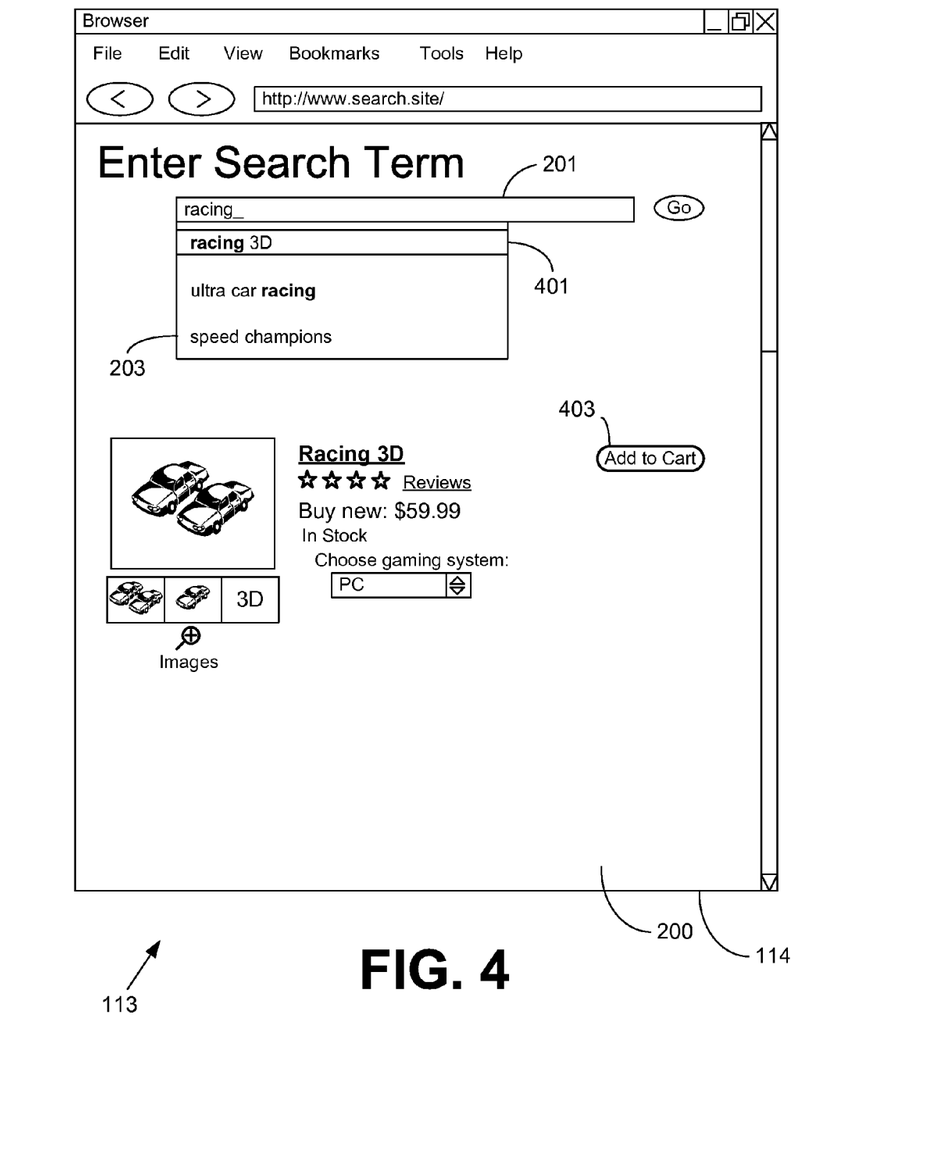
FIG. 4 is a drawing of a user interface generated by the computing device of FIG. 1 according to an embodiment of the present disclosure.

Referring next to FIG. 4, shown is an example of an alternative search term user interface 200 rendered on a client 107 (FIG. 1) that can be asynchronously updated by the search application 111 (FIG. 1) according to an embodiment of the disclosure. In the depicted non-limiting example, which is in the context of an electronic commerce system implemented by the computing device 103 (FIG. 1), the user has entered characters of a search term in the search term user interface element 201, and the search application 111 asynchronously updates the dropdown box 203 with suggested search terms retrieved from the suggestion generator 121 (FIG. 1) of the search engine 112 (FIG. 1).

In addition, the search application 111 can asynchronously update the dropdown box 203 to reflect navigation input of a user on a client 107. In the depicted example, the search application 111 asynchronously updates the dropdown box 203 to reflect navigation input of a user as well as to highlight a selected item 401. When the user selects the selected item 401 in the search term user interface 200, the search application 111 asynchronously updates the content page 114 with additional data retrieved from the electronic repository 105 (FIG. 1).

In the depicted example, the search application 111 asynchronously updates the search term user interface 200 with data such as, but not limited to, product imagery, a product title, product reviews, pricing, and other data retrieved from the electronic repository 105 that can be associated with the item corresponding to the selected suggested search term. Additionally, the search application 111 updates the depicted content page 114 or search term user interface 200 with a purchasing user interface element 403 that allows a user to purchase an item associated with a suggested search term that is available in an electronic commerce system.

Figure 5:
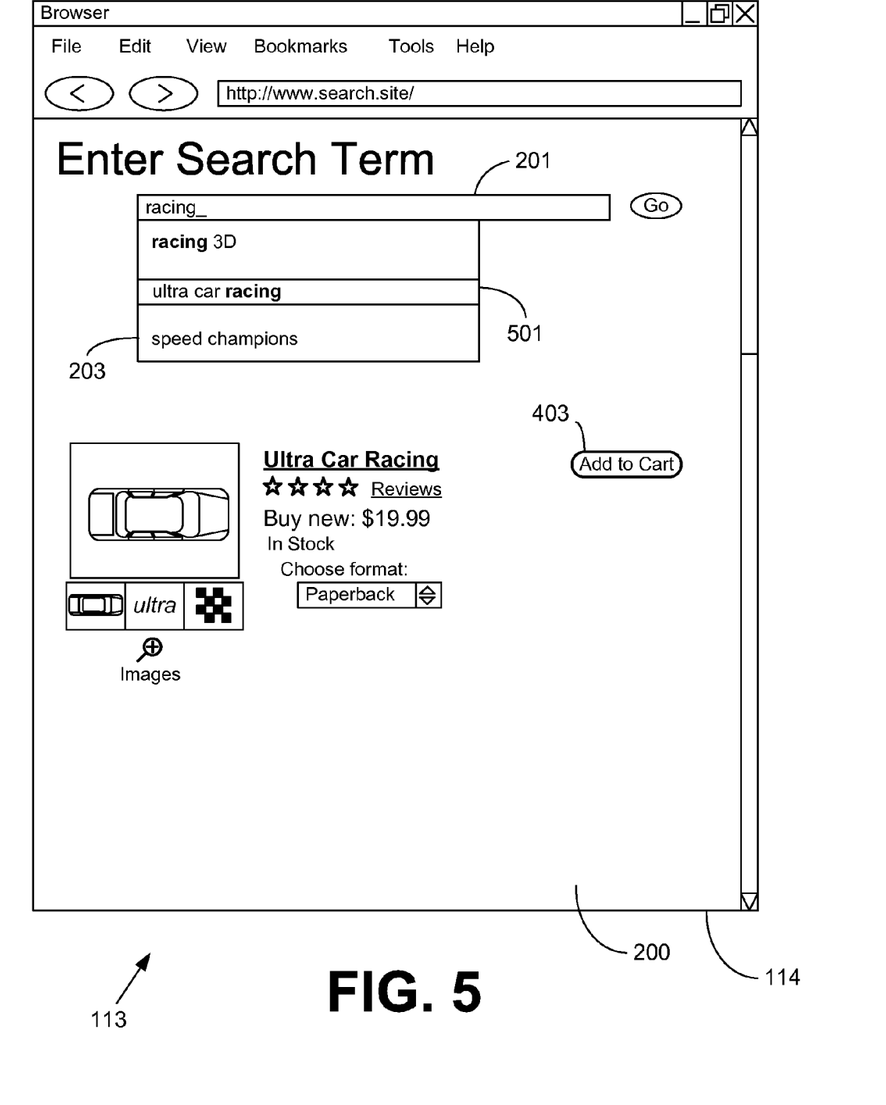
FIG. 5 is a drawing of the user interface of FIG. 4 that is asynchronously updated by the computing device of FIG. 1 according to an embodiment of the present disclosure.

Reference is now made to FIG. 5, which continues the example of FIG. 4 according to various embodiments. In the depicted example, the search application 111 (FIG. 1) asynchronously updates the dropdown box 203 in the search term user interface 200 to reflect navigation input of a user. As a non-limiting example, in the depicted dropdown box 203, the user can strike a down arrow key on a keyboard input device in order to cause the search application 111 to asynchronously update the dropdown box 203 to reflect a new selection 501 from the displayed suggested search terms.

Upon selection of a different suggested search term by a user, the search application 111 can asynchronously update the content page 114 or search term user interface 200 to reflect the selection. In the depicted example, the search application 111 asynchronously updates the search term user interface 200 by retrieving data from the electronic repository 105 (FIG. 1) that is associated with the new selection 501. In this way, the search application 111 can allow a user to receive suggested search terms as well as view data associated with an item or search result corresponding to the suggested search term (e.g., representative imagery, item details, etc.), without having to cause the search term user interface element 201 to submit a form to the search application 111 and render a new search results page that contains a list of search results.

Figure 6A:
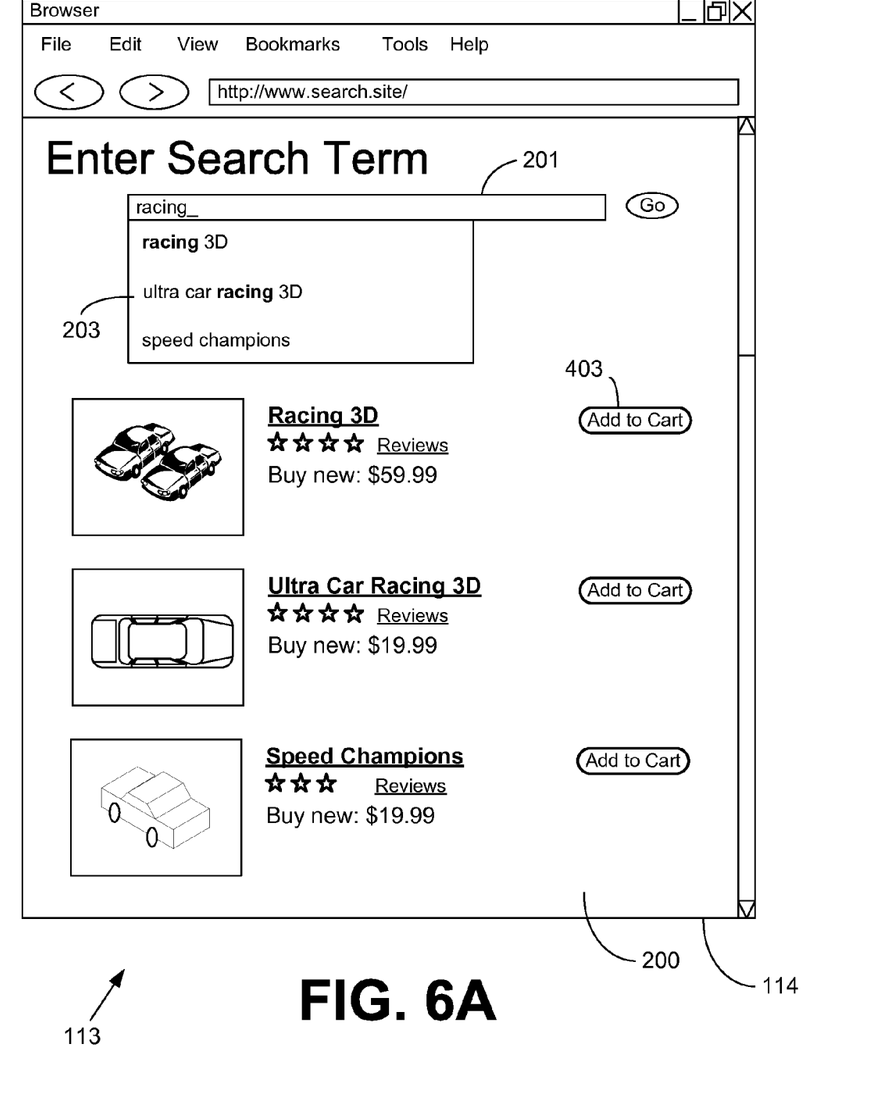
FIG. 6A is a drawing of a user interface generated by the computing device of FIG. 1 according to an embodiment of the present disclosure.

Referring next to FIG. 6A, shown is an example of an alternative search term user interface 200 rendered on a client 107 (FIG. 1) that can be asynchronously updated by the search application 111 (FIG. 1) according to an embodiment of the disclosure. In the depicted non-limiting example, which is in the context of an electronic commerce system implemented by the computing device 103 (FIG. 1), the user has entered characters of a search term in the search term user interface element 201, and the search application 111 asynchronously updates the dropdown box 203 with suggested search terms retrieved from the suggestion generator 121 (FIG. 1) of the search engine 112 (FIG. 1).

In the depicted example, the search application 111 can asynchronously update the content page 114 of search term user interface 200 with additional data regarding multiple items in the electronic repository 105 (FIG. 1), such as, but not limited to, representative imagery, item details, and, in the case of an electronic commerce system implemented by the computing device 103, product ratings, a purchasing user interface element 403, and other related elements can be asynchronously updated in the search results user interface 200.

Figure 6B:
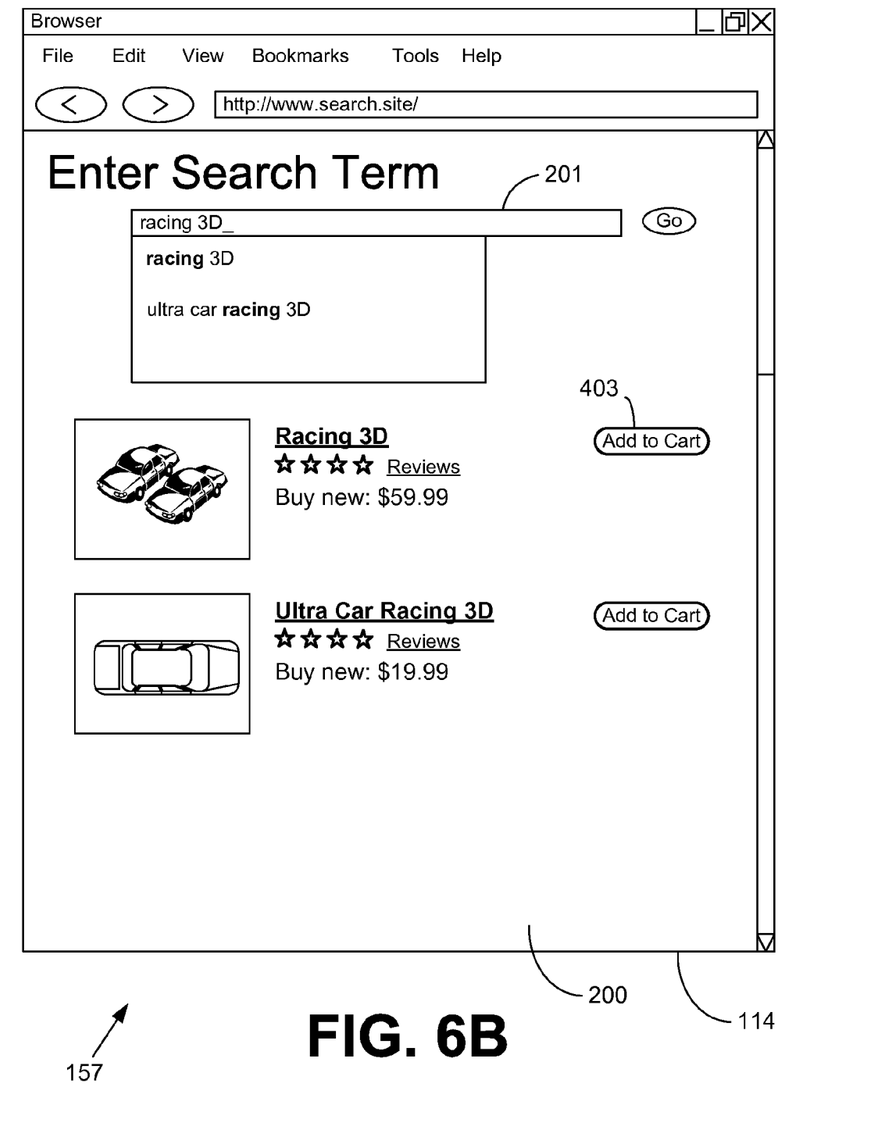
FIG. 6B is a drawing of the user interface of FIG. 6 that is asynchronously updated by the computing device of FIG. 1 according to an embodiment of the present disclosure.

Continuing the example of FIG. 6A, reference is now made to FIG. 6B, which further illustrates the asynchronous updating of the search term user interface 200 of FIG. 6A by the search application 111 (FIG. 1) according to various embodiments of the disclosure. In the depicted example, a user has further refined the entered search term, or entered additional characters in the search term user interface element 201. Accordingly, the search application 111 asynchronously updates the search term user interface 200 with suggested search terms retrieved from the suggestion generator 121 (FIG. 1) of the search engine 112 (FIG. 1) that correspond to the characters entered in the search term user interface element 201. In the non-limiting example of FIG. 6B, the additional entered characters cause the suggestion generator 121 to determine that one of the suggested search terms depicted in FIG. 6A is no longer related to the search term in the search term user interface element 201. Accordingly, the search application 111 asynchronously updates the content page 114 by removing the suggested search term and the additional data retrieved from the electronic repository 105 (FIG. 1) that is associated with the suggested search term.

Figure 7:
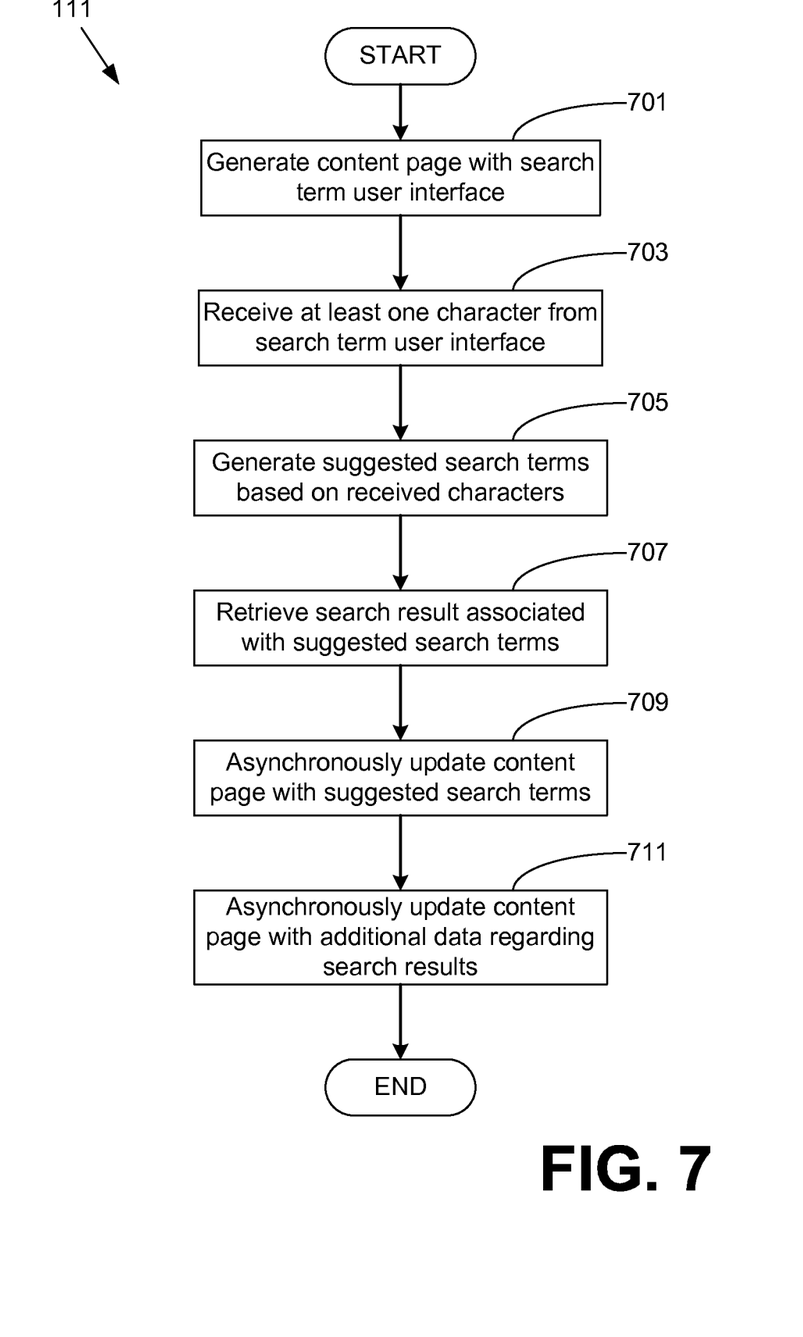
FIG. 7 is a drawing of a flowchart that illustrates one example of the operation of a search application executed in the computing device depicted in FIG. 1 according to an embodiment of the present disclosure.

Referring next to FIG. 7, shown is a flowchart that provides one example of the operation of a portion of the search application 111 according to various embodiments. It is understood that the flowchart of FIG. 7 provides merely an example of the many different types of functional arrangements that may be employed to implement the operation of the portion of the search application 111 as described herein. As an alternative, the flowchart of FIG. 7 may be viewed as depicting an example of steps of a method implemented in the computing device 103 (FIG. 1) according to one or more embodiments.

First, in box 701, a content page 114 (FIG. 1) or other type of user interface with a search term user interface 200 (FIG. 3A) is generated for a client 107 (FIG. 1). As noted above, a client 107 can render a content page 114 in a browser 113 (FIG. 1) or render a user interface in another type of application, as can be appreciated. Next, in box 703, at least one character is received by the search application 111 from the search term user interface 200. In box 705, the search application 111 provides suggested search terms based at least upon the received characters. As noted above, suggested search terms can be based upon the characters of a search term, popularity of an item in an electronic repository 105 (FIG. 1), a user's profile or interests, etc., and other factors as can be appreciated. In one embodiment, the suggested search terms can be transmitted to the browser 113 and placed in a browser cache, so that as a user continues to enter characters in a search term user interface 200, the suggested search terms corresponding to the entered characters can be retrieved from the cache rather than as a result of a network request from the search application 111.

In box 707, the search application 111 retrieves a search result associated with the suggested search terms. In box 709, the search application 111 asynchronously updates the content page 114 or other user interface with the suggested search terms. In box 711, the search application 111 retrieves additional data from the electronic repository 105 that is associated with each of the search results, and asynchronously updates the content page 114 with the additional data retrieved from the electronic repository 105.

Figure 8:
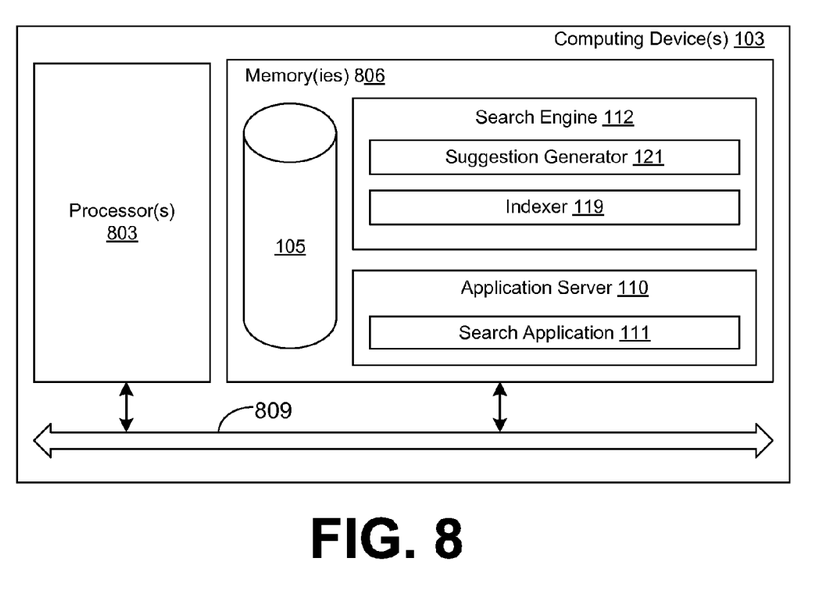
FIG. 8 is a drawing of one example of the computing device of FIG. 1 according to an embodiment of the present disclosure.

With reference to FIG. 8, shown is a schematic block diagram of the computing device 103 according to an embodiment of the present disclosure. The computing device 103 includes at least one processor circuit, for example, having a processor 803 and a memory 806, both of which are coupled to a local interface 809. To this end, the computing device 103 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the application server 110, the search application 111, and potentially other applications. Also stored in the memory 806 may be an electronic repository 105 and other data. In addition, an operating system may be stored in the memory 806 and executable by the processor 803.

It is understood that there may be other applications that are stored in the memory 806 and are executable by the processors 803 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network 109 (FIG. 1) that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the application server 110, the search application 111, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 7 shows the functionality and operation of an implementation of portions of the search application 111. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowchart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the search application 111, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications Therefore, the following is claimed:

1. A method, comprising:
generating, in at least one computing device, a content page having a search term user interface element;
generating, in the at least one computing device, a plurality of suggested search terms based at least upon at least one character entered in the search term user interface element, the at least one character corresponding to a portion of a search term;
asynchronously updating, in the at least one computing device, the content page with the plurality of suggested search terms based at least upon the at least one character entered in the search term user interface element;
retrieving, in the at least one computing device, from an electronic repository, a plurality of search results associated with each of the plurality of suggested search terms;
retrieving, in the at least one computing device, from an electronic repository, representative image associated with each of the plurality of search results; and
asynchronously updating, in the at least one computing device, the search term user interface element with a dropdown box displayed proximate to the search result user interface element with a list of the suggested search terms, wherein each of the suggested search terms is associated with at least two of the plurality of search results and the at least two of the plurality of search results are displayed horizontally offset from a respective one of the suggested search term, and wherein each of the plurality of search results is displayed using the representative image associated with the search result.

2. A method, comprising:
generating, in at least one computing device, a content page having a search term user interface element;
receiving, in the at least one computing device, at least one character from the search term user interface element, the at least one character corresponding to a search for an item in an electronic repository;
generating, in the at least one computing device, a plurality of suggested search terms corresponding to the at least one character;
retrieving, from the electronic repository, at least one search result associated with each of the plurality of suggested search terms, the electronic repository storing data associated with products available from an electronic commerce system;
asynchronously updating, in the at least one computing device, the content page with a suggested search term user interface element, the suggested search term user interface element displaying the plurality of suggested search terms in a list beneath the search term user interface element, wherein each item in the list beneath the search term user interface element corresponds to a respective one of the plurality of suggested search terms and each of the plurality of suggested search terms is associated with a plurality of search results displayed horizontally offset from one of the plurality of suggested search terms and each of the plurality of search results is associated with a representative image;
receiving, in the at least one computing device, at least one additional character from the search term user interface element;
determining, in the at least one computing device, that the at least one suggested search term is no longer relevant to the suggested search term user interface element based at least in part upon the at least one additional character;
removing, in the at least one computing device, the at least one suggested search term from the content page;
generating, in the at least one computing device, at least one other suggested search term corresponding to the at least one additional character;
retrieving, from the electronic repository, at least one other search result associated with the at least one other suggested search term; and
asynchronously updating, in the at least one computing device, the content page with another suggested search term user interface element.

3. The method of claim 2, further comprising asynchronously updating the content page with a product detail user interface element with information about the at least one other search result, the information about the at least one other search result comprising at least one of: a price or a rating.

4. The method of claim 2, further comprising:
receiving at least one navigation input corresponding to user input on an input device; and
asynchronously updating the other suggested search term user interface element to reflect the at least one navigation input by indicating one of the plurality of search results as a selected one of the search results.

5. The method of claim 4, wherein asynchronously updating the other suggested search term user interface element further comprises enlarging the representative image associated with the selected one of the search results.

6. A system, comprising:
at least one computing device; and
a search application executed in the at least one computing device, the search application causing the at least one computing device to at least:
generate a content page having a search term user interface element;
generate a plurality of suggested search terms based at least upon at least one character entered in the search term user interface element, the at least one character corresponding to a portion of a search term;
retrieve from an electronic repository a plurality of search results associated with each of the plurality of suggested search terms;
retrieve a representative image associated with a respective search result for each of the plurality of search results;
asynchronously update the content page with based at least upon the at least one character entered in the search term user interface element, wherein the content page is asynchronously updated with a dropdown box placed proximate to the search term user interface element, wherein the dropdown box displays a list of the plurality of suggested search terms, wherein each of the suggested search terms is displayed horizontally offset from the plurality of search results, wherein each of the plurality of search results is displayed with the representative image associated with the respective search result;
retrieve from the electronic repository, data associated with the search result, the electronic repository storing data associated with products available from an electronic commerce system;

determine, based at least in part, upon at least one additional character entered in the search term user interface element that at least one of the plurality of suggested search terms is no longer related to the search term; and remove the at least one of the plurality of suggested search terms from the content page in response to receiving the at least one additional character entered in the search term user interface element to generate a refined plurality of suggested search terms.

7. The system of claim 6, wherein the search result associated with each of the plurality of suggested search terms is most relevant to each of the plurality of suggested search terms.

8. The system of claim 6, wherein the search result further comprises a product in an electronic commerce system and the data further comprises at least one of: a product name, a product description, and product reviews.

9. The system of claim 8, wherein the search application further causes the at least one computing device to asynchronously update the content page with a product detail user interface element corresponding to a selected search result, the product detail user interface element comprising at least one of a price or a rating.

10. The system of claim 6, wherein the search application further causes the at least one computing device to:

receive at least one navigation input corresponding to user input on an input device, the navigation input corresponding to a plurality of mouse movements and the input device corresponding to a mouse;

asynchronously update the search term user interface element to reflect the at least one navigation input by highlighting one of the plurality of search results selected by the user; and asynchronously enlarge the representative image associated with the one of the plurality of search results that is highlighted.

11. A non-transitory computer readable medium having a plurality of computer instructions executable on a computing device, wherein when executed, the plurality of computer instructions cause the computing device to at least:

generate a content page having a search term user interface element;

generate a plurality of suggested search terms based upon at least one character entered in the search term user interface element, the at least one character corresponding to a portion of a search term;

retrieve from an electronic repository a plurality of search results associated with each of the plurality of suggested search terms;

retrieve a representative image associated with a respective search result for each of the plurality of search asynchronously update the content page based at least in part upon the at least one character entered in the search term user interface element, wherein the content page is asynchronously updated with a dropdown box placed proximate to the search term user interface element, wherein the dropdown box displays a list of the plurality of suggested search terms, wherein each of the suggested search terms is displayed horizontally offset from the plurality of search results, wherein each of the plurality of search results is displayed with the representative image associated with the respective search result;

retrieve, from the electronic repository, data associated with at least one of the search results, the electronic repository storing data associated with products available from an electronic commerce system;

asynchronously update the content page with the data associated with the at least one of the search results; and determine, in response to at least one additional character being entered into the search term user interface element, that at least one suggested search term among the plurality of suggested search terms is no longer relevant to the search term.

12. The non-transitory computer readable medium of claim 11, wherein the search result associated with each of the plurality of suggested search terms is a most relevant search result to one of the plurality of suggested search terms.

13. The non-transitory computer readable medium of claim 11, wherein the data further comprises at least one of: a product name, a product description, and product reviews.

14. The non-transitory computer readable medium of claim 13, wherein when executed, the plurality of computer instructions further cause the computing device to at least asynchronously update the content page with a product detail user interface element corresponding to a selected search result, the product detail user interface element comprising at least one of: a price or a rating.

15. The non-transitory computer readable medium of claim 11, wherein when executed, the plurality of computer instructions further cause the computing device to at least:

receive at least one navigation input corresponding to user input on an input device, the navigation input corresponding to mouse movements and the input device corresponding to a mouse;

asynchronously update the search term user interface element to reflect the at least one navigation input by highlighting the at least one search result associated with the one of the plurality of suggested search terms selected by the user; and asynchronously enlarge the at least one representative image associated with the at least one search result that is highlighted.

* * * * *